(12) United States Patent
Kim et al.

(10) Patent No.: US 10,204,423 B2
(45) Date of Patent: Feb. 12, 2019

(54) VISUAL ODOMETRY USING OBJECT PRIORS

(71) Applicant: Adobe Inc., San Jose, CA (US)

(72) Inventors: Vladimir Kim, Seattle, WA (US);
Oliver Wang, Seattle, WA (US);
Minhyuk Sung, Stanford, CA (US);
Mehmet Ersin Yumer, San Jose, CA (US)

(73) Assignee: Adobe Inc., San Jose, CA (US)

( * ) Notice: Subject to any disclaimer, the term of this patent is extended or adjusted under 35 U.S.C. 154(b) by 95 days.

(21) Appl. No.: 15/430,659

(22) Filed: Feb. 13, 2017

(65) Prior Publication Data
US 2018/0232906 A1    Aug. 16, 2018

(51) Int. Cl.
*G06T 7/73*     (2017.01)
*G06T 7/246*    (2017.01)
*G06T 5/00*     (2006.01)

(52) U.S. Cl.
CPC .............. *G06T 7/75* (2017.01); *G06T 5/002* (2013.01); *G06T 7/251* (2017.01); *G06T 2200/04* (2013.01); *G06T 2207/10012* (2013.01); *G06T 2207/10021* (2013.01); *G06T 2207/10028* (2013.01); *G06T 2207/20024* (2013.01);
(Continued)

(58) Field of Classification Search
CPC ........... G06T 5/002; G06T 7/251; G06T 7/75; G06T 2200/04; G06T 2207/10012; G06T 2207/10021; G06T 2207/10028; G06T 2207/20024; G06T 2207/30241; G06T 2207/30244
See application file for complete search history.

(56) References Cited

U.S. PATENT DOCUMENTS 8,873,846 B2   10/2014  Jin
8,923,638 B2   12/2014  Jin
(Continued)

OTHER PUBLICATIONS

Nianjuan Jiang et al.,ICCV 2013, Global Linear Method for Camera Pose Registration, 2013 IEEE International Conference on Computer Vision pp. 481-488.*
(Continued)

*Primary Examiner* — Mekonen Bekele
(74) *Attorney, Agent, or Firm* — Finch & Maloney PLLC

(57) ABSTRACT

Disclosed are techniques for more accurately estimating the pose of a camera used to capture a three-dimensional scene. Accuracy is enhanced by leveraging three-dimensional object priors extracted from a large-scale three-dimensional shape database. This allows existing feature matching techniques to be augmented by generic three-dimensional object priors, thereby providing robust information about object orientations across multiple images or frames. More specifically, the three-dimensional object priors provide a unit that is easier and more reliably tracked between images than a single feature point. By adding object pose estimates across images, drift is reduced and the resulting visual odometry techniques are more robust and accurate. This eliminates the need for three-dimensional object templates that are specifically generated for the imaged object, training data obtained for a specific environment, and other tedious preprocessing steps. Entire object classes identified in a three-dimensional shape database can be used to train an object detector.

16 Claims, 7 Drawing Sheets

(52) U.S. Cl.
CPC ............... *G06T 2207/30241* (2013.01); *G06T 2207/30244* (2013.01)

(56) References Cited

U.S. PATENT DOCUMENTS

| | | | |
|---|---|---|---|
| 8,934,677 B2 | 1/2015 | Jin | |
| 8,942,422 B2 | 1/2015 | Jin | |
| 9,083,945 B2 | 7/2015 | Jin | |
| 9,131,208 B2 | 9/2015 | Jin | |
| 9,317,928 B2 | 4/2016 | Jin | |
| 2009/0315978 A1* | 12/2009 | Wurmlin | G06T 5/005 348/43 |
| 2013/0155058 A1* | 6/2013 | Golparvar-Fard | G06T 19/006 345/419 |
| 2013/0215221 A1* | 8/2013 | Wang | G06T 7/73 348/43 |
| 2013/0265439 A1* | 10/2013 | Jin | H04N 5/232 348/169 |
| 2014/0037194 A1* | 2/2014 | Kitamura | G01B 11/24 382/154 |
| 2015/0138185 A1* | 5/2015 | Huang | G06T 17/00 345/419 |
| 2017/0069071 A1* | 3/2017 | Jung | G06K 9/00201 |
| 2017/0098312 A1* | 4/2017 | Souchard | G02B 27/017 |

OTHER PUBLICATIONS

Vishek Chatterjee et al., ICCV 2013. Efficient and Robust Large-Scale Rotation Averaging, 2013 IEEE International Conference on Computer Visio, pp. 521-528.*

Bao et al., "Dense Object Reconstruction with Semantic Priors", Proceedings of the 2013 IEEE Conference on Computer Vision and Pattern Recognition, pp. 1264-1271 (2013).

Bao et al., "Semantic Structure from Motion", Proceedings of the 2011 IEEE International Conference on Computer Vision and Pattern Recognition, pp. 2025-2032 (2011).

Bewley et al., "Simple Online and Realtime Tracking", arXiv preprint arXiv:1602.00763v1 (Feb. 2, 2015).

Cadena et al., "Past, Present, and Future of Simultaneous Localization and Mapping: Towards the Robust-Perception Age", arXiv preprint arXiv:1606.05830v3 (Nov. 23, 2016).

Chang et al., "ShapeNet: An Information-Rich 3D Model Repository", arXiv preprint arXiv:1512.03012v1 (Dec. 9, 2015).

Chatterjee et al., "Efficient and Robust Large-Scale Rotation Averaging", Proceedings of the 2013 IEEE International Conference on Computer Vision and Pattern Recognition, pp. 521-528 (2013).

Choi et al., "Robust Reconstruction of Indoor Scenes", Proceedings of the 2015 IEEE Conference on Computer Vision and Pattern Recognition, pp. 5556-5565 (2015).

Civera et al., "Towards Semantic SLAM using a Monocular Camera", Proceedings of the 2011 IEEE/RSJ International Conference on Intelligent Robots and Systems, pp. 1277-1284 (2011), retreived from <http://webdiis.unizar.es/~jcivera/papers/civera_etal_iros11.pdf> on Dec. 24, 2016.

Crocco et al., "Structure from Motion with Objects", Proceedings of the 2016 IEEE Conference on Computer Vision and Pattern Recognition, pp. 4141-4149 (2016).

Dame et al., "Dense Reconstruction Using 3D Object Shape Priors", Proceedings of the 2013 IEEE Conference on Computer Vision and Pattern Recognition, pp. 1288-1295 (2013).

Fredriksson et al., "Simultaneous Multiple Rotation Averaging using Lagrangian Duality", Proceedings of the 2012 Asian Conference on Computer Vision, pp. 245-258 (2012), retreived from <http://www2.maths.lth.se/vision/publdb/reports/pdf/fredriksson-olsson-accv-12.pdf> on Dec. 24, 2016.

Furukawa et al., "Manhattan-world Stereo", Proceedings of the 2009 IEEE Conference on Computer Vision and Pattern Recognition, pp. 1422-1429 (2009), retreived from <http://grail.cs.washington.edu/projects/manhattan/manhattan.pdf> on Dec. 24, 2016.

Gallup et al., "Piecewise Planar and Non-Planar Stereo for Urban Scene Reconstruction", Proceedings of the 2010 IEEE Conference on Computer Vision and Pattern Recognition, pp. 1422-1429 (2009), retreived from <http://www.cs.unc.edu/~gallup/papers/CVPR2010.pdf> on Dec. 24, 2016.

Glocker et al., "Real-Time RGB-D Camera Relocalization via Randomized Ferns for Keyframe Encoding", IEEE Transactions on Visualization and Computer Graphics, vol. 21, pp. 571-583 (2015), retreived from <https://www.microsoft.com/en-us/research/wp-content/uploads/2016/02/glocker2014tvcg5B15D.pdf> on Dec. 24, 2016.

Handa et al., "A Benchmark for RGB-D Visual Odometry, 3D Reconstruction and SLAM", Proceedings of the 2014 IEEE International Conference on Robotics and Automation, pp. 1524-1531 (2014), retreived from <https://www.doc.ic.ac.uk/~ahanda/VaFRIC/icra2014.pdf> on Dec. 24, 2016.

Hane et al., "Class Specific 3D Object Shape Priors Using Surface Normals", Proceedings of the 2014 IEEE Conference on Computer Vision and Pattern Recognition, pp. 1-8 (2014).

Hartley et al., "L1 rotation averaging using the Weiszfeld algorithm", Proceedings of the 2011 IEEE Conference on Computer Vision and Pattern Recognition, pp. 3041-3048 (2011).

Hua et al., "SceneNN: a Scene Meshes Dataset with aNNotations", Proceedings of the 2016 Fourth International Conference on 3D Vision, pp. 92-101 (2016), retreived from <http://people.sutd.edu.sg/~saikit/projects/sceneNN/pdf/dataset_3dv16.pdf> on Dec. 24, 2016.

Jiang et al., "A Global Linear Method for Camera Pose Registration", Proceedings of the 2013 IEEE International Conference on Computer Vision and Pattern Recognition, pp. 481-488 (2013).

Kendall et al., "PoseNet: A Convolutional Network for Real-Time 6-DOF Camera Relocalization", Proceedings of the 2015 IEEE International Conference on Computer Vision and Pattern Recognition, pp. 2938-2946 (2015).

Kowalski et al., "Online 3D face reconstruction with Incremental Structure From Motion and a regressor cascade", Proceedings SPIE 9290, Photonics Applications in Astronomy, Communications, Industry, and High-Energy Physics Experiments, 92902W-1-92902W-8 (2014).

Lucas et al., "An Iteratvie Image Registration Technique with an Application to Stereo Vision", Proceedings of the Seventh International Joint Conference on Artificial Intelligence, pp. 674-679 (1981).

Moulon et al., "Global Fusion of Relative Motions for Robust, Accurate and Scalable Structure from Motion", Proceedings of the 2013 IEEE International Conference on Computer Vision and Pattern Recognition, pp. 3248-3255 (2013).

Newcombe et al., "KinectFusion: Real-Time Dense Surface Mapping and Tracking", IEEE Transactions on Visualization and Computer Graphics, pp. 127-136 (2011), retreived from <https://www.microsoft.com/en-us/research/wp-content/uploads/2016/02/ismar2011.pdf> on Dec. 24, 2016.

Ozyesil et al., "Robust Camera Location Estimation by Convex Programming", Proceedings of the 2015 IEEE Conference on Computer Vision and Pattern Recognition, pp. 2674-2683 (2015).

Ramadasan et al., "DCSLAM: A Dynamically Constrained Real-Time Slam", Proceedings of the 2015 IEEE International Conference on Image Processing, pp. 1130-1134 (2015).

Ren et al., "Faster R-CNN: Towards Real-Time Object Detection with Region Proposal Networks", arXiv preprint arXiv:1506.01497v3 (Jan. 6, 2016).

Salas-Moreno et al., "Dense Planar SLAM", Proceedings of the 2014 IEEE International Symposium on Mixed and Augmented Reality, pp. 157-164 (2014), retreived from <https://www.doc.ic.ac.uk/~rfs09/docs/salas-moreno_ismar2014.pdf> on Dec. 26, 2016.

Salas-Moreno et al., "SLAM++: Simultaneous Localisation and Mapping at the Level of Objects", Proceedings of the 2013 IEEE Conference on Computer Vision and Pattern Recognition, pp. 1352-1359 (2013).

Stewénius et al., "Recent Developments on Direct Relative Orientation", ISPRS Journal of Photogrammetry and Remote Sensing, 60(4), pp. 284-294 (2006), retreived from <http://www.vis.uky.edu/%7Estewe/publications/stewenius_engels_nister_5pt_isprs.pdf> on Dec. 26, 2016.

(56) References Cited

OTHER PUBLICATIONS

Su et al., "Render for CNN: Viewpoint Estimation in Images Using CNNs Trained with Rendered 3D Model Views", arXiv preprint arXiv:1505.05641v1 (May 21, 2015).

Sweeney et al., "Theia: A Fast and Scalable Structure-from-Motion Library", Proceedings of the 23rd ACM International Conference on Multimedia, pp. 693-696 (2015).

Tamaazousti et al., "NonLinear Refinement of Structure from Motion Reconstruction by Taking Advantage of a Partial Knowledge of the Environment", Proceedings of the 2011 IEEE Conference on Computer Vision and Pattern Recognition, pp. 3073-3080 (2011), retreived from <http://mohamed-tamaazousti.com/files/pdf/Tamaazousti_etal_CVPR11.pdf> on Dec. 26, 2016.

Triggs et al., "Bundle Adjustment—A Modern Synthesis", Vision Algorithms '99, LNCS 1883, pp. 298-372 (2000), retreived from <https://lear.inrialpes.fr/pubs/2000/TMHF00/Triggs-va99.pdf> on Dec. 26, 2016.

Umeyama, "Least-Squares Estimation of Transformation Parameters Between Two Point Patterns", IEEE TRansactions on Pattern Analysis and Machine Intelligence, 13(4), pp. 376-380 (1991).

Wilson et al., "Robust Global Translations with 1DSfM", Computer Vision—ECCV 2014, Springer International Publishing, pp. 61-75 (2014).

Xiang et al., "ObjectNet3D: A Large Scale Database for 3D Object Recognition", Proceedings of the 2016 European Conference on Computer Vision, pp. 160-176 (2016), retreived from <http://www-cs.stanford.edu/~roozbeh/papers/Xiang16eccv.pdf> on Dec. 26, 2016.

\* cited by examiner

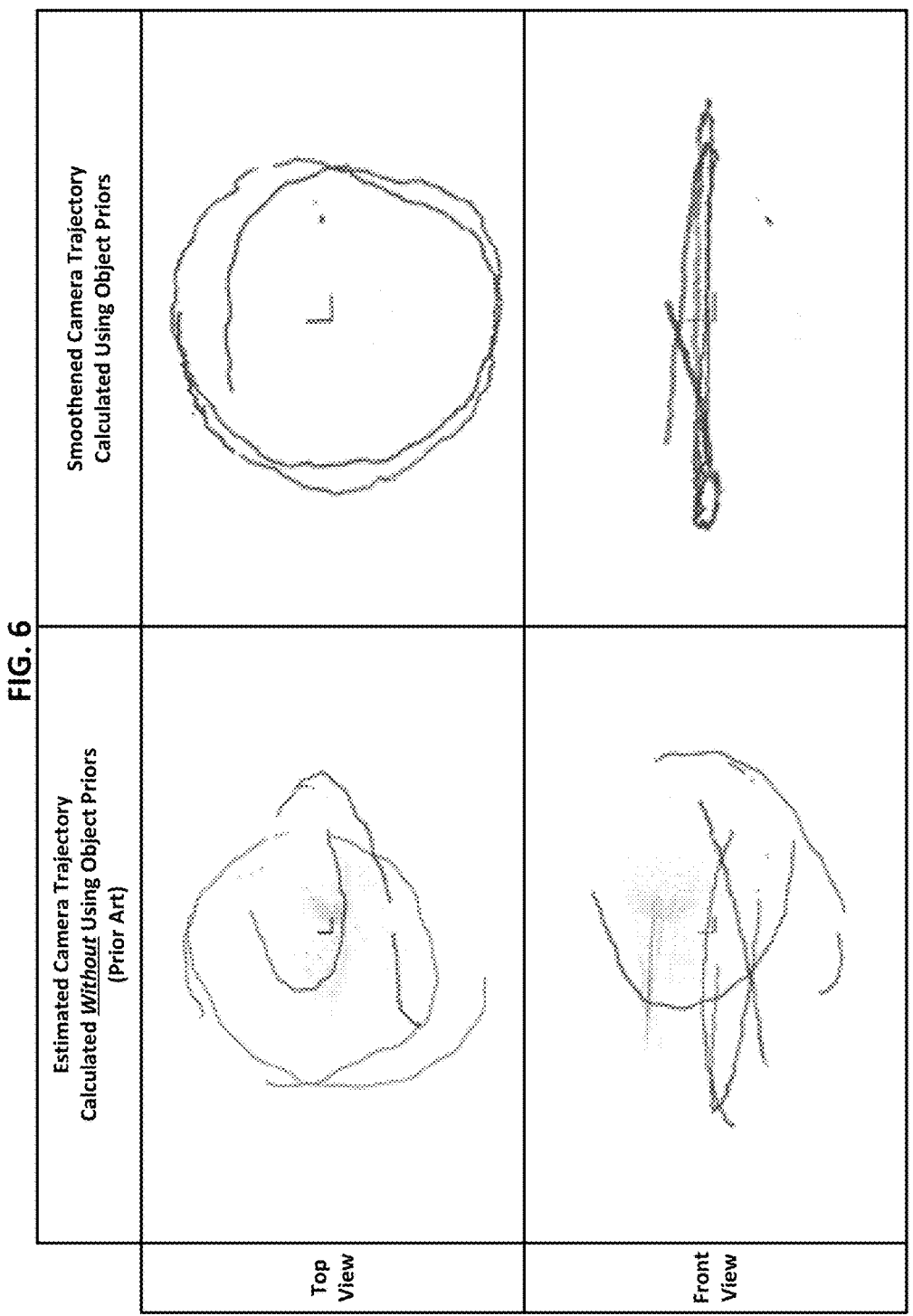

VISUAL ODOMETRY USING OBJECT PRIORS

FIELD OF THE INVENTION

This disclosure relates generally to computer vision analysis, and more specifically to techniques for using object priors extracted from a large-scale three-dimensional shape database to more accurately estimate the pose of a camera that was used to capture a three-dimensional scene.

BACKGROUND

In the field of computer vision, "visual odometry" refers to the process of inferring the pose of a camera by analyzing a collection of images captured using the camera. As used herein, the "pose" of a camera refers to the location and orientation of the camera. A typical visual odometry application will involve estimating a series of camera poses from a set of point correspondences identified in image pairs that depict a three-dimensional scene. In some cases the camera poses are estimated using two-dimensional imagery, while in other cases a more accurate estimate can be achieved by using a three-dimensional template to register image pairs. In either case, the analyzed images may comprise, for example, a collection unorganized still images, frames extracted from a video recording, or some combination thereof. Algorithms used to perform visual odometry are often referred to as Structure from Motion (SFM) or Simultaneous Localization and Mapping (SLAM) algorithms. Computationally efficient and accurate visual odometry algorithms are valuable because they enable a wide range of applications such as three-dimensional image-based modeling and rendering, video stabilization, panorama stitching, video augmentation, vision-based robot navigation, and human-computer interaction. For example, in filmmaking SFM algorithms enable match moving techniques that allow computer-generated imagery (CGI) to be seamlessly integrated into live-action footage with correct position, scale, orientation, and motion.

BRIEF DESCRIPTION OF THE DRAWINGS

FIG. 6 is a table comparing estimated camera trajectories calculated with and without the use of object priors extracted from a large-scale three-dimensional shape database.

DETAILED DESCRIPTION

Figure 1:
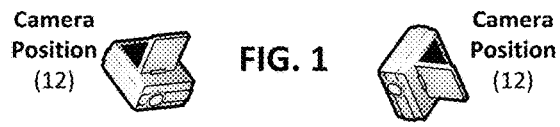
FIG. 1 is a diagram schematically illustrating one way of using object priors extracted from a large-scale three-dimensional shape database to more accurately estimate the pose of a camera that was used to capture a three-dimensional scene.
Figure 1:
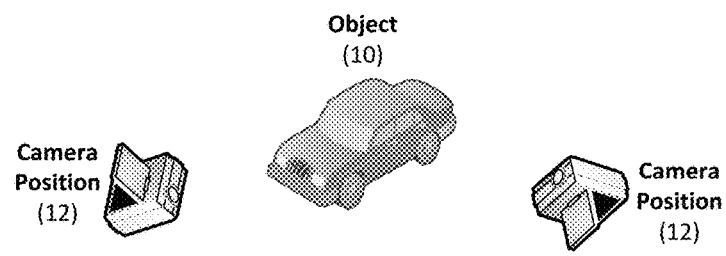
Figure 1:
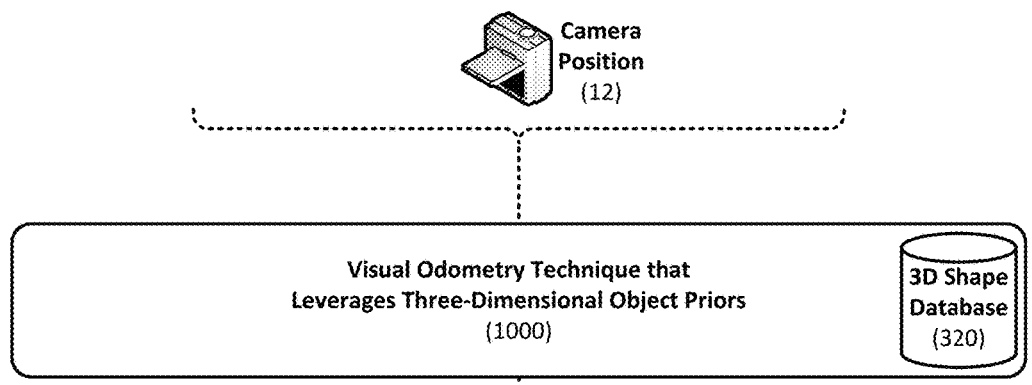
Figure 1:
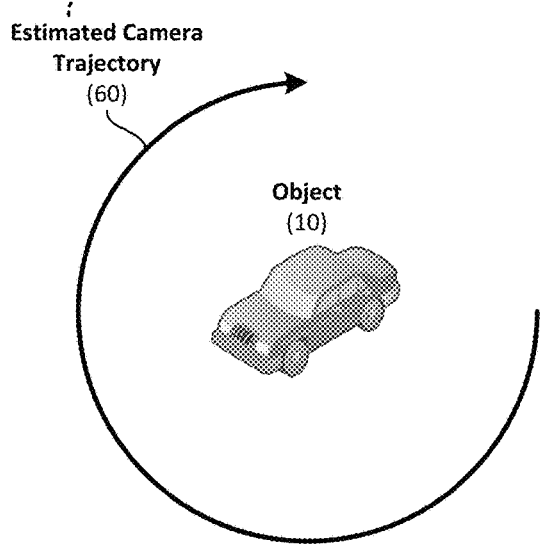

Existing visual odometry techniques rely on feature matching between images to estimate camera pose. Because feature matching techniques tend to be highly localized within a given image, they tend to be brittle and often fail to estimate correct feature correspondences between images. As a result, a number of improvements have been proposed to enhance the reliability and accuracy of the feature matching algorithms that support visual odometry techniques. For example, as noted above, using a three-dimensional template to register image pairs can produce more accurate feature matching between images. However, as a practical matter, accurate three-dimensional models for the objects in an imaged scene are often unavailable. Generating such models usually involves tedious preprocessing steps to analyze a particular imaged scene. In many cases this preprocessing may be impossible or impractical. Other visual odometry improvements require large scale training data, and are thus practical only where a camera is to be localized in a previously captured environment. These drawbacks are representative of the challenge associated with improving existing visual odometry techniques.

In recognition of this challenge, disclosed herein are techniques for using object priors extracted from a large-scale three-dimensional shape database to more accurately estimate the pose of a camera that was used to capture a three-dimensional scene. This allows existing feature matching techniques to be augmented by generic three-dimensional object priors, thereby providing robust information about object orientations across multiple frames of a given sequence of images. Because feature matching techniques only provide relative camera poses between two images, noise can accumulate over an analysis of several images. But object priors can be independently computed for multiple images, thereby providing absolute object prior information with respect to static objects in the scene. In other words, the three-dimensional object priors provide a unit that is easier and more reliably tracked across a sequence of images than a single feature point across an image pair. By adding object pose estimates across images, drift is reduced and the resulting visual odometry techniques are more robust and accurate. Certain of the improvements disclosed herein thus take advantage of the growing accessibility of large-scale three-dimensional shape databases that depict common objects, as well as recent advances in neural networks used for object detection. Such improvements also eliminate the need for three-dimensional object templates that are specifically generated for the imaged object, training data obtained for a specific environment, and other tedious preprocessing steps. In other words, instead of requiring an exact three-dimensional model of a specific imaged object, entire object classes that are identified in a three-dimensional shape database can instead be used to train an object detector. These and other advantages will be apparent in light of the disclosure provided herein.

FIG. 1 is a diagram schematically illustrating one way of using object priors extracted from a large-scale three-dimensional shape database to more accurately estimate the pose of a camera that was used to capture a three-dimensional scene. A three-dimensional object 10 is imaged from a plurality of different camera positions 12. This could be accomplished by panning a video camera around object 10 as the camera records a sequence of video frames at camera positions 12. It could additionally or alternatively be accomplished by snapping still photographs of object 10 at different camera positions 12, either using a single camera or multiple cameras. In either case, it should be appreciated that the techniques disclosed herein can be used with casually captured monocular videos or image collections, including images curated from diverse sources such as Internet search engines. A distinct camera position may be assumed for each image or frame in an image sequence. Regardless of how the source imagery is acquired, camera positions 12 will be unknown. A visual odometry technique 1000 that leverages object priors extracted from a large-scale three-dimensional shape database 320 is then invoked. As a baseline, any suitable existing feature matching technique can be performed on the source imagery. But the results of such technique are augmented by adding constraints on relative object positions between images based on the identified three-dimensional object priors. More specifically, the identified object priors constrain relative object poses across frames, and therefore provide a more accurate estimate of the different camera positions 12. These estimates can be combined into an aggregate estimated camera trajectory 60. As noted above, estimated camera trajectory 60 can be used in a wide range of applications including three-dimensional image-based modeling and rendering, video stabilization, panorama stitching, video augmentation, vision-based robot navigation, and human-computer interaction. Numerous alternative configurations and modifications of this workflow will be apparent in light of this disclosure.

In the following detailed description, numerous specific details are set forth to provide a thorough understanding of how to use object priors extracted from a large-scale three-dimensional shape database to more accurately estimate camera poses and trajectories. However, it should be appreciated that the claimed subject matter may be practiced without these specific details. Furthermore, in some cases, methods, apparatuses, or systems that would be known by an ordinarily-skilled artisan have not been described in detail so as not to obscure claimed subject matter. It should also be appreciated that certain of the techniques disclosed herein can also be used in other applications where efficient, robust, and accurate feature matching is sought, even outside the context of visual odometry applications.

Some portions of the detailed description which follow are presented in terms of algorithms, equations, or other symbolic representations of operations on binary digital signals stored within a memory of a specific apparatus of a special purpose computing device or platform. In this context, the term "specific apparatus" or the like includes a general purpose computer once it is programmed to perform particular functions pursuant to instructions from program software. Algorithmic descriptions or symbolic representations are examples of techniques used by ordinarily-skilled artisans in the signal processing and related arts to convey the substance of their work to others. As used herein, the term "algorithm" refers, in addition to its ordinary meaning, to a self-consistent sequence of operations or similar signal processing that leads to a desired result. In this context, operations or signal processing involve physical manipulation of physical quantities. Typically, although not necessarily, such physical quantities take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Therefore, unless specifically stated otherwise, terms such as "processing", "computing", "calculating", "determining", and the like refer to actions or processes of a specific apparatus, such as a special purpose computer or a similar special purpose electronic computing device. A special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

System Architecture

Figure 2:
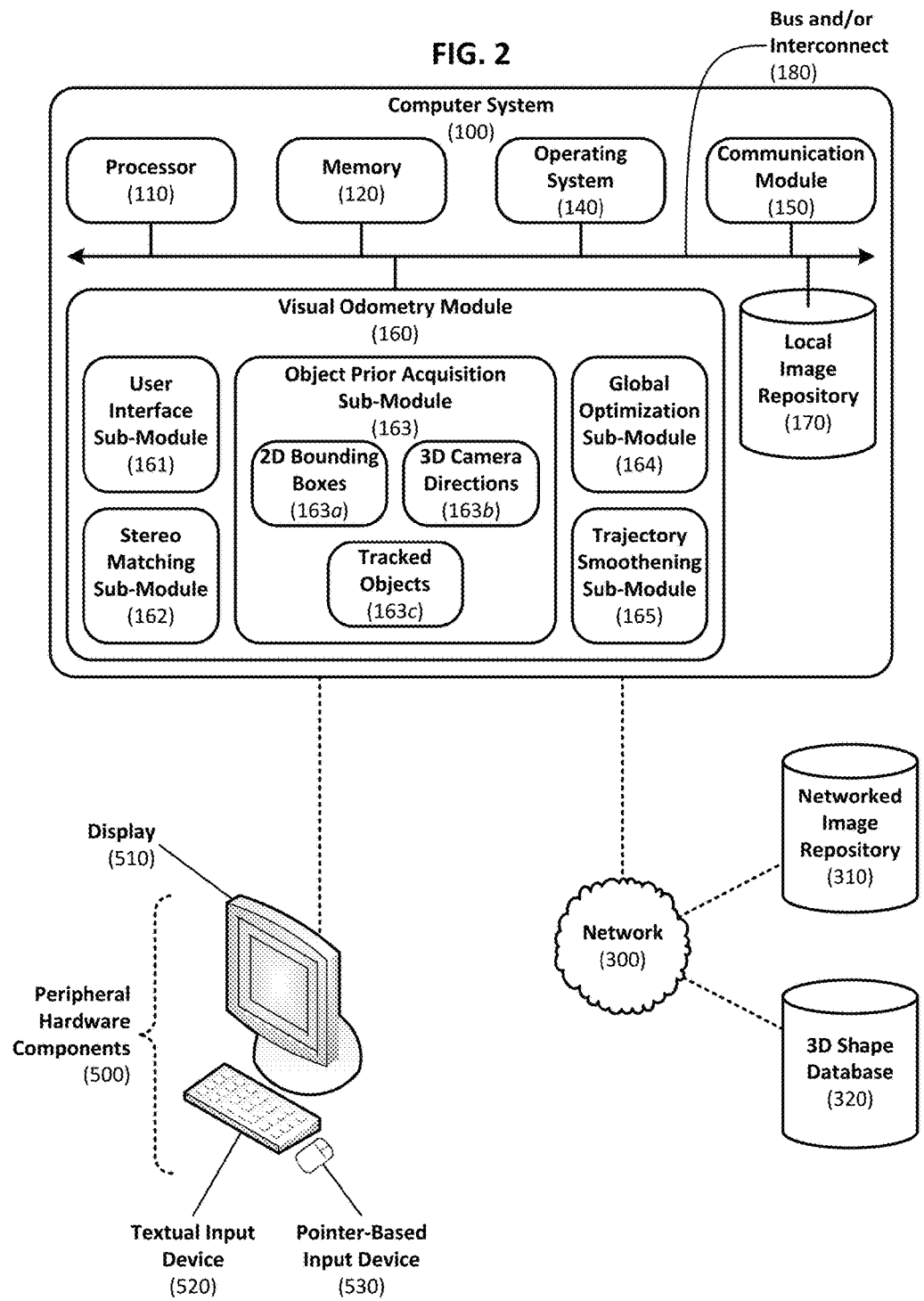
FIG. 2 is a block diagram schematically illustrating selected components of an example computer system that can be used to leverage object priors extracted from a large-scale three-dimensional shape database to more accurately estimate the pose of a camera that was used to capture a three-dimensional scene.

FIG. 2 is a block diagram schematically illustrating selected components of an example computer system 100 that can be used to leverage object priors extracted from a large-scale three-dimensional shape database 320 to more accurately estimate the pose of a camera that was used to capture a three-dimensional scene. Computer system 100 may comprise, for example, one or more devices selected from a desktop computer, a laptop computer, a workstation, a tablet computer, a smartphone, a handheld computer, a set-top box, an enterprise class server, or any other such computing device. A combination of different devices may be used in certain embodiments. In general, computer system 100 will be understood as including software configured to implement the various functionalities disclosed herein, as well as hardware that enables such implementation. Examples of enabling hardware include a processor 110, a memory 120, a communication module 150, a local image repository 170, and a bus and/or interconnect 180. Examples of implementing software include an operating system 140 and a visual odometry module 160. In one particular implementation, visual odometry module 160 further comprises a user interface sub-module 161, a stereo matching sub-module 162, an object prior acquisition sub-module 163, a global optimization sub-module 164, and a trajectory smoothening sub-module 165. Depending on the granularity of implementation, computer system 100 may include additional, alternative, or fewer hardware and software components in other embodiments. The present disclosure therefore should not be understood as being limited to the particular architecture and components illustrated in FIG. 2.

FIG. 2 also illustrates that, depending on the particular type of device used for implementation, computer system 100 is optionally coupled to, or otherwise implemented in conjunction with, one or more peripheral hardware components 500. Examples of peripheral hardware components 500 include a display 510, a textual input device 520 (such as a keyboard), and a pointer-based input device 530 (such as a mouse). One or more other input/output devices, such as a touch sensitive display, a speaker, a printer, a printer capable of generating a three-dimensional object (often colloquially referred to as a "3D printer"), or a microphone, can be used in other embodiments. For example, in a particular alternative embodiment wherein computer system 100 is implemented in the form of a tablet computer, certain functionality associated with the particular peripheral hardware components 500 illustrated in FIG. 2 is provided instead by a touch sensitive surface and a camera that form part of the tablet computer. Thus, for example, a tablet computer used to visually scan an object using an integrated camera could also determine a camera trajectory around the scanned object.

In general, computer system 100 may be coupled to a network 300 to allow for communications with other computing devices or resources, such as a networked image repository 310 and the aforementioned three-dimensional shape database 320. Networked image repository 310 can be used to store imagery and/or corresponding estimated camera trajectories 60 as determined using the techniques disclosed herein. Three-dimensional shape database 320 provides a large-scale dataset of three-dimensional shapes, optionally with category and alignment annotations. Another resource which may be accessed via network 300 is a remote image processing server that provides additional computing resources to supplement the capacity of local processor 110. Network 300 may be a local area network (such as a home-based or office network), a wide area network (such as the Internet), a peer-to-peer network (such as a Bluetooth connection), or a combination of such networks, whether public, private, or both. For example, in certain embodiments at least a portion of the functionality associated with network 300 is provided by a cellular data network, thereby making it easier for users of smartphones, tablet computers, and other portable devices to leverage networked resources. In general, it should be appreciated that communications amongst the various entities and resources described herein may occur via wired and/or wireless connections.

Processor 110 can be any suitable processor, and may include one or more coprocessors or controllers, such as an audio processor or a graphics processing unit, to assist in control and processing operations associated with computer system 100. Memory 120 can be implemented using any suitable type of digital storage, such as one or more of a disc drive, a flash memory device, or a random access memory device. In certain embodiments memory 120 is used to store instructions that, when executed using processor 110, cause operations associated with visual odometry module 160 and/or one of its constituent sub-modules to be invoked. In some cases memory 120 hosts local image repository 170, which can be used to store source imagery and/or corresponding estimated camera trajectories 60 as determined using the techniques disclosed herein. Communication module 150 can be any appropriate network chip or chipset which allows for wired or wireless connection to other components of computer system 100, to peripheral hardware components 500 (if any), and to network 300, thereby enabling computer system 100 to communicate with other local and remote computer systems, services, and resources, examples of which include networked image repository 310 and three-dimensional shape database 320. Bus and/or interconnect 180 allows for inter- and intra-device communications using communication module 150.

Operating system 140 may comprise any suitable operating system, such as Android™ (Google Inc., Mountain View, Calif.), Windows® (Microsoft Corp., Redmond, Wash.), or OS X® (Apple Inc., Cupertino, Calif.). As will be appreciated in light of this disclosure, the techniques provided herein can be implemented without regard to the particular operating system provided in conjunction with computer system 100, and therefore may also be implemented using any suitable existing or subsequently developed platform. Visual odometry module 160 is capable of using object priors extracted from a large-scale three-dimensional shape database 320 to more accurately estimate the pose of a camera that was used to capture a three-dimensional scene. Such functionality can be implemented in conjunction with a wide range of existing or subsequently developed visual effects software applications, one example of which is After Effects® (Adobe Systems Incorporated, San Jose, Calif.). In the example embodiment illustrated in FIG. 2, visual odometry module 160 comprises user interface sub-module 161, stereo matching sub-module 162, object prior acquisition sub-module 163, global optimization sub-module 164, and trajectory smoothening sub-module 165. In certain embodiments visual odometry module 160 and its sub-modules are implemented by a non-transitory computer readable medium and one or more processors (such as processor 110) of a computing apparatus (such as computer system 100). The computer readable medium may store program instructions executable by the one or more processors to cause the computing apparatus to perform one or more of the techniques described herein. Other embodiments of visual odometry module 160 may be at least partially implemented by hardware circuitry and/or firmware stored, for example, in a nonvolatile memory resource.

Figure 5:
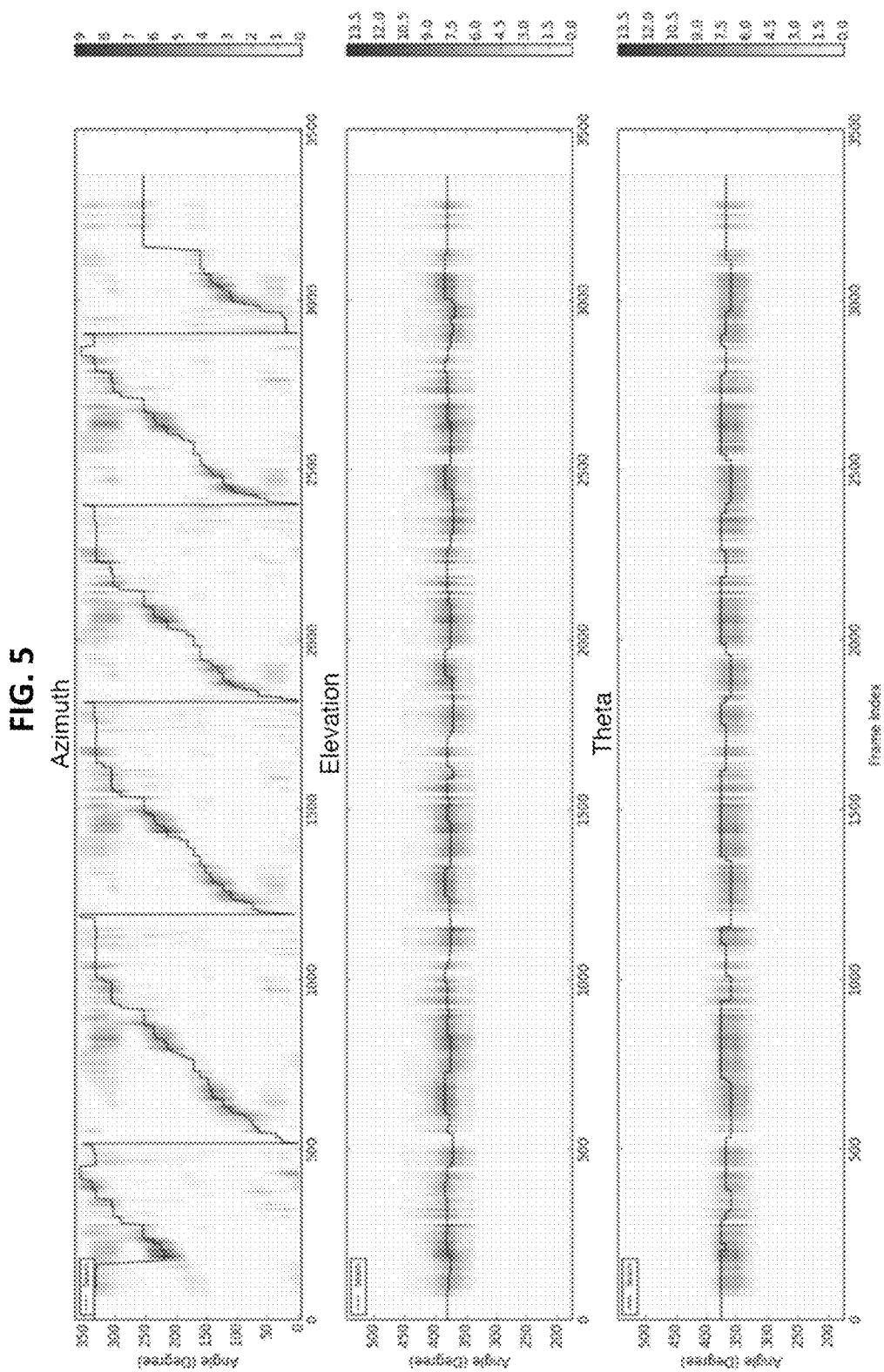
FIG. 5 comprises three graphs illustrating a predicted camera angle for azimuthal, elevational, and in-plane (θ) rotation as a function of frame number in a video recording of an example three-dimensional scene.

In certain embodiments, user interface sub-module 161 comprises instructions encoded on a computer readable medium that, when executed using processor 110, cause a user interface to be generated. In one embodiment, the generated user interface enables a user to identify source imagery that forms the basis for a visual odometry technique, as will be described in turn. This can be accomplished by allowing the user to identify source imagery stored in local image repository 170, or alternatively, by allowing the user to access networked source imagery, for example as may be stored in networked image repository 310, or as may be retrieved from the Internet using a search engine. Likewise, in terms of output, the generated user interface may also be used to view, manipulate, and save any number of estimated camera trajectories determined using the techniques disclosed herein. In some cases the user interface can simultaneously display source imagery and an estimated camera trajectory over the source imagery. The user interface is also optionally configured to display a graph of predicted camera angles as a function of frame number, as illustrated in FIG. 5 as will be described in turn. In certain embodiments user interface sub-module 161 provides file browsing functionality to facilitate the retrieval and storage of a wide range of digital assets. Beyond this, the generated user interface may also be used to manipulate the visual odometry technique itself, for example by adjusting odometry parameters and identifying external resources which are to be leveraged, such as a preferred three-dimensional shape database.

Figure 4:
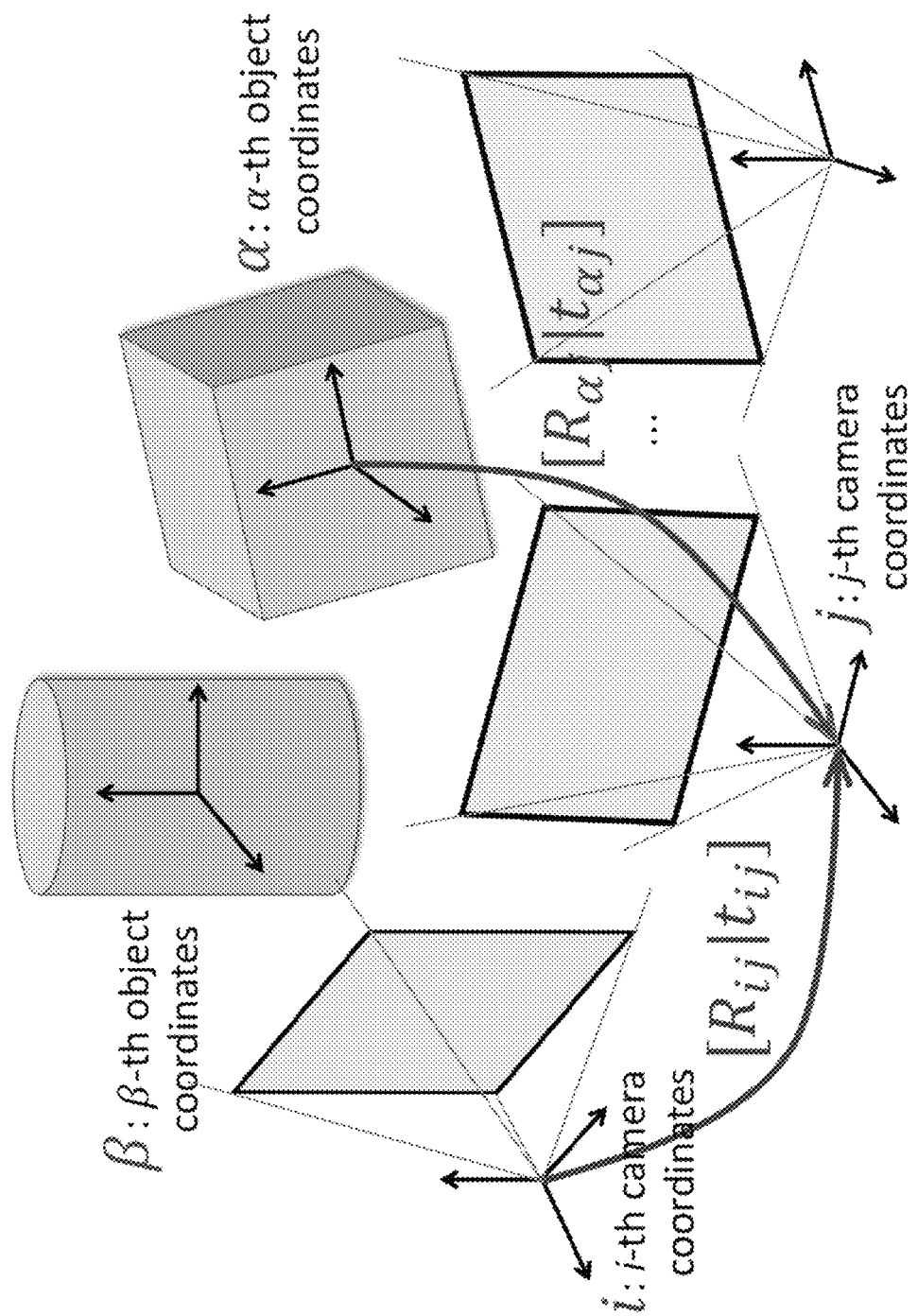
FIG. 4 is a diagram illustrating relative camera rotation and translation $[R_{ij}|t_{ij}]$ between an ith camera position and a jth camera position, as well as a corresponding object-to-camera rotation and translation $[R_{\alpha j}|t_{\alpha ij}]$ between the jth camera position and an αth object prior.

In certain embodiments, stereo matching sub-module 162 comprises instructions encoded on a computer readable medium that, when executed using processor 110, estimate rotations $R_{ij}$ and translations $t_{ij}$ between an ith camera position and a jth camera position with respect to a three-dimensional world coordinate system $W \in \mathbb{R}^3$, as illustrated in FIG. 4. In certain embodiments, such rotations and translations can be estimated by computing per-frame object orientations and positions in the camera coordinate system. Then, to generate world coordinate camera positions, pairs of these estimates are used to constrain the relative rotations and translations of objects. For example, let $\mathcal{I} = \{I_1, I_2, I_3, \ldots, I_{\mathcal{I}}\}$ to be a set of images taken from a three-dimensional world $W \in \mathbb{R}^3$, with camera $C_i$ for each image $I_i$. Let $R_i \in so(3)$ and $t_i \in \mathbb{R}^3$ be the rotation and translation, respectively, of camera $C_i$ with respect to the world coordinate system. In this context, stereo matching sub-module 162 can be configured to estimate rotations $R_i$ and translations $t_i$ with respect to the world coordinate system. Here the indices i and j are used to indicate local coordinates of two different cameras, while the terms "orientation" and "rotation" are used interchangeably.

For image pair $\{I_i, I_j\}$ where $I_i \in \mathcal{I}$ and $I_j \in \mathcal{I}$, let $R_{ij} \in$ so (3) be the relative rotation between images $I_i$ and $I_j$. Here $C_i \in \mathbb{R}^3$ is the position of camera $C_i$ in W. Let the unit vector $$\vec{t}_{ij}^i = \frac{t_{ij}^i}{\|t_{ij}^i\|} \quad (1)$$

be the translation direction with respect to $C_i$. In certain embodiments stereo matching sub-module 162 uses feature point correspondences to calculate epipolar geometries between two images, including relative pairwise rotation $R_{ij}$ and the translation direction $\vec{t}_{ij}^i$ with respect to the ith camera coordinates. These describe a transformation between two adjacent camera poses. As mentioned previously, the term "camera pose" encompasses both a camera position (describing where the camera is located) and a camera orientation (describing where the camera is pointed). If the estimations are perfect, they satisfy the conditions $$R_{ij} = R_j R_i^T \quad (2)$$

and $$R_i^T \vec{t}_{ij}^i = \frac{t_j - t_i}{\|t_j - t_i\|_2}. \quad (3)$$

In implementations where there are multiple camera pairs from which epipolar geometries can be obtained, a stereo matching energy function is formulated to aggregate all of the pairwise information by reducing or minimizing the difference between the measurements and the predicted global camera positions. Based on given distance metrics $d_1$: $SO3 \times SO3 \rightarrow \mathbb{R}$ and $d_2$: $S^2 \times S^2 \rightarrow \mathbb{R}$, stereo matching sub-module 162 can be configured to determine the rotation and translation components of the stereo matching energy function as:

$$E_R = \sum_{(i,j)} d_1(R_{ij}, R_j R_i^T) \quad (4)$$

and $$E_t = \sum_{(i,j)} d_2\left(R_i^T \vec{t}_{ij}^i, \frac{t_j - t_i}{\|t_j - t_i\|_2}\right), \quad (5)$$

respectively. In such implementations stereo matching sub-module 162 minimizes these energy functions in two separate computations for rotation and translation. In general, any suitable technique can be used to minimize the stereo matching energy functions provided in Equations (4) and (5). In some cases, such techniques may be referred to as "optimization", and may be understood as producing a solution that reduces a particular energy term given one or more constraints. More specifically, reducing or minimizing the energy terms provided in Equations (4) and (5) can be understood as finding a solution that closely represents estimated camera poses as defined by the rotation and translation components. In one implementation, stereo matching sub-module 162 minimizes the L1 norm in the Lie algebraic space to solve the rotation component, as disclosed by Chatterjee et al., "Efficient and Robust Large-Scale Rotation Averaging", *Proceedings of the* 2013 *IEEE International Conference on Computer Vision and Pattern Recognition*, pp. 521-528 (2013). In one implementation stereo matching sub-module 162 solves the translation component using a nonlinear least squares minimizing squared chordal distance, as described by Wilson et al., "*Robust Global Translations with 1DSfM*", Computer Vision—ECCV 2014, Springer International Publishing, pp. 61-75 (2014).

In certain embodiments, object prior acquisition sub-module 163 comprises instructions encoded on a computer readable medium that, when executed using processor 110, detect object locations and estimate three-dimensional object orientations. The detected object locations in a given image are defined by two-dimensional bounding boxes 163a that can be calculated using any suitable shape detection technique. For example, in one embodiment object prior acquisition sub-module 163 detects the object locations using the "Faster R-CNN" technique described by Ren et al., "*Faster R-CNN: Towards Real-Time Object Detection with Region Proposal Networks*", arXiv preprint arXiv: 1506.01497v3 (6 Jan. 2016).

Three dimensional camera directions 163b can be estimated based on three-dimensional shape database 320 which contains three-dimensional models and objects from known object classes. For example, in one embodiment object prior acquisition sub-module 163 estimates three-dimensional object orientations using the "Render for CNN" technique described by Su et al., "*Render for CNN: Viewpoint Estimation in Images Using CNNs Trained with Rendered 3D Model Views*", arXiv preprint arXiv:1505.05641v1 (21 May 2015). In such embodiments three-dimensional shape database 320 is provided by ShapeNet (available at shapenet.org), which is a richly-annotated, large-scale dataset of three-dimensional shapes with random background. Three-dimensional shape database 320 provides a known structure for an entire class of shapes, thereby allowing orientations to be predicted with greater accuracy. Using random backgrounds enables object prior acquisition sub-module 163 to work with object classes rather than specific object instances. Notably, the acquired object prior need not be the same as the object appearing in the source imagery. In many cases, an object prior that is simply in the same object class as the imaged object will have a sufficiently large number of common features to allow the orientation of the imaged object to be predicted accurately.

In one embodiment three-dimensional camera directions are estimated by projecting centers of the aforementioned bounding boxes and then calculating a translation direction $\vec{t}_{i\alpha}^i$ by shooting a ray from the camera to the bounding box center. Other orientation techniques can be used in other embodiments, including subsequently developed techniques for detecting objects using neural networks. Estimating object orientations based on the three-dimensional shape database 320 allows additional objects with known three-dimensional structure to be analyzed in related images, thereby enhancing existing SFM techniques. The result of applying the Faster R-CNN and Render for CNN techniques is a per-object bounding box and probability distribution over a range of Euler angles for each input image.

Even where a sequence of video frames is analyzed, objects are still detected in each frame separately. In this case, multiple object-camera constraints for a particular tracked object 163c can be connected with a single object pose variable if common object instances are identified across frames. For example, Faster R-CNN identifies object class, but there still may be multiple objects of the same class in a given scene. Therefore in certain embodiments object prior acquisition sub-module 163 is further configured to track objects using a Kalman filter on two-dimensional bounding box centers and scales. One way of doing this is using the "SORT" technique described by Bewley et al., "*Simple Online and Realtime Tracking*", arXiv preprint arXiv:1602.00763v1 (2 Feb. 2015). This allows a constraint to be introduced that requires only the same class objects to belong to a particular object instance. An aspect ratio can be used in the Kalman filter to smooth the estimated two-dimensional bounding boxes 163a over time. In general, tracking a particular object over a longer sequence of frames results in a more accurate object prior for subsequent global optimization calculations.

In certain embodiments, object prior acquisition sub-module 163 also identifies object-to-object correspondences based on point-wise feature matches in the identified object priors. For example, in a given frame $\mathcal{I}$, let $\mathcal{O} = \{\mathcal{O}_1, \mathcal{O}_2, \mathcal{O}_3, \ldots, \mathcal{O}_{|\mathcal{O}|}\}$ be a set of objects that are detected in $\mathcal{I}$. For the acquired object priors, let $R_{\alpha i}$ be the rotation from object $O_\alpha$ to camera $C_i$ provided that $O_\alpha$ is detected in $I_i$. Further, let $\bar{t}_{i\alpha}{}^i$ be the camera-to-object translation direction from $C_i$ to $O_\alpha$. For all objects detected in the two-dimensional scene, additional variables for object rotations $R_\alpha$ and translations $t_\alpha$ in world space can be added. The relative camera poses transforming a particular detected object are given by $$R_{\alpha i} = R_i R_\alpha^T \quad (6)$$

and $$R_i^T \bar{t}_{i\alpha}^i = \frac{t_\alpha - t_i}{\|t_\alpha - t_i\|_2}. \quad (7)$$

An object prior energy function can be formulated to aggregate all of the pairwise information by reducing or minimizing the difference between the measurements and the predicted global camera positions. Based on the aforementioned distance metrics $d_1: SO3 \times SO3 \to \mathbb{R}$ and $d_2: S^2 \times S^2 \to \mathbb{R}$, object prior acquisition sub-module 163 can be configured to determine the rotation and translation components of the object prior energy function as:

$$E_R = \sum_{(\alpha,i)} d_1(R_{\alpha i}, R_i R_\alpha^T) \quad (8)$$

and $$E_t = \sum_{(\alpha,i)} d_2\left(R_i^T \bar{t}_{i\alpha}^i, \frac{t_\alpha - t_i}{\|t_\alpha - t_i\|_2}\right), \quad (9)$$

respectively. In such implementations object prior acquisition sub-module 163 minimizes these energy functions in two separate computations for rotation and translation. Reducing or minimizing the energy terms provided in Equations (8) and (9) can be understood as finding a solution that closely represents estimated camera positions as defined by the rotation and translation components. As noted above, any suitable technique can be used to minimize the object prior energy functions provided in Equations (8) and (9), including the aforementioned techniques described by Chatterjee et al., and Wilson et al.

In certain embodiments global optimization sub-module 164 comprises instructions encoded on a computer readable medium that, when executed using processor 110, integrate the stereo matching energy functions provided in Equations (4) and (5) with the object prior energy functions provided in Equations (8), and (9). The integrated energy functions are then minimized. The result, for rotation and translation, is $$\min_{(R_i, R_\alpha)} \left[ \sum_{(i,j)} d_1(R_{ij}, R_j R_i^T) + \sigma_R \sum_{(\alpha,i)} d_1(R_{\alpha i}, R_i R_\alpha^T) \right] \text{ and} \quad (10)$$

$$\min_{(t_i, t_\alpha)} \left[ \sum_{(i,j)} d_2\left(R_i^T \bar{t}_{ij}^i, \frac{t_j - t_i}{\|t_j - t_i\|_2}\right) + \sigma_T \sum_{(\alpha,i)} d_2\left(R_i^T \bar{t}_{i\alpha}^i, \frac{t_\alpha - t_i}{\|t_\alpha - t_i\|_2}\right) \right], \quad (11)$$

respectively. Here $\sigma_R$ and $\sigma_T$ are energy term weights for rotation and translation, respectively. Reducing or minimizing the values provided by these integrated energy functions will produce per-frame rotations and translations that define camera poses that are predicted for image pairs based on feature matches (from stereo matching sub-module 162) and predicted object orientations (from object prior acquisition sub-module 163). Because Equations (10) and (11) have the same form as the pairwise camera terms, they can be solved using the same techniques (see, for example, Chatterjee et al., and Wilson et al.). Reducing or minimizing the values provided by the integrated energy functions provided in Equations (10) and (11) allows per-object predicted rotations and translations to be included in existing SFM techniques, thus enabling camera poses and camera trajectories to be predicted with greater accuracy.

In certain embodiments trajectory smoothening sub-module 165 comprises instructions encoded on a computer readable medium that, when executed using processor 110, determine a smoothened path of transformations corresponding to camera motion in a video recording. This smoothened path is based on the predicted camera poses generated by global optimization sub-module 164, as described above. More specifically, global optimization sub-module 164 predicts camera poses as a classification in terms of azimuthal, elevational, and in-plane (θ) rotation, and further generates confidence values for each of these dimensions. When the input imagery comprises a video recording, a temporal continuity is optionally enforced on the predictions. Considering temporal continuity thus provides high-probability camera pose estimates that are consistent not only with stereo matching techniques and acquired object priors, but also with neighboring frames in the video recording.

Based on the foregoing, for a given time sequence associated with source imagery, trajectory smoothening sub-module 165 comprises dynamic programming that selects angle samples for each frame. Let p(f, s) denote the obtained probability of angle sample s at frame f, and let α(f, s) denote an accumulated score for angle sample s at frame f. At the first analyzed frame f=1 and α(f, s)=p(f, s). For the next frame α(f, s) can be computed as $$\alpha(f, s) = p(f, s) + \min_{s' \in N(s)} \{\alpha(f - 1, s') + w\|s - s'\|_2^2\}, \quad (12)$$

where N(s) is a circular range of neighbors around angle s and w is a small weight that penalizes large-angle movements. The chosen angle s' is identified, and after all frames have been processed, the angle sample s with the highest score α(f, s) can be identified. Angle samples can then be backtracked to the first frame. This allows consistent predictions to be made across frames. In certain embodiments the dynamic programming provided by trajectory smoothening sub-module 165 is separately performed for azimuthal, elevational, and in-plane (θ) rotation.

For example, FIG. 5 comprises three graphs illustrating a predicted camera angle as calculated by trajectory smoothening sub-module 165 for azimuthal, elevational, and in-plane (θ) rotation as a function of frame number in a video of an example three-dimensional scene. The accumulated score α(f, s) for a given frame is indicated by shading, with higher shading indicating higher accumulated scores, and thus a higher likelihood predicted angle. The cyclical nature of the projected azimuthal angle combined with the relatively constant projected angle for elevational and in-plane (θ) rotation indicates a camera rotating around an object with constant elevation and in-plane (θ) position. In some implementations user interface sub-module 161 is configured to display a graph of predicted camera angle as a function of frame number, as illustrated in FIG. 5.

FIG. 6 is a table comparing estimated camera trajectories calculated with and without the use of object priors extracted from a large-scale three-dimensional shape database. An example smoothened camera trajectory associated with the camera rotation of FIG. 5 is illustrated in the right column of FIG. 6. In contrast, the left column of FIG. 6 illustrates an estimated camera trajectory calculated using existing techniques, that is, without the benefit of object priors acquired from three-dimensional shape database 320. As can be seen, the trajectories calculated using existing techniques have more discontinuities and are less refined than the trajectories calculated using object priors. Thus it can be seen that incorporating object priors as described herein provides a more refined solution and a more accurate starting point for subsequent visual odometry processing, such as bundle adjustment.

The embodiments described herein can be implemented in various forms of hardware, software, firmware, or special purpose processors. For example, in one embodiment a non-transitory computer readable medium has instructions encoded thereon that, when executed by one or more processors, cause aspects of the visual odometry techniques 1000 disclosed herein to be implemented. The instructions can be encoded using any suitable programming language, such as C, C++, object-oriented C, Java, JavaScript, Visual Basic .NET, BASIC, Scala, or alternatively, using custom or proprietary instruction sets. Such instructions can be provided in the form of one or more computer software applications or applets that are tangibly embodied on a memory device, and that can be executed by a computer having any suitable architecture. In one embodiment the system can be hosted on a given website and implemented, for example, using JavaScript or another suitable browser-based technology.

The functionalities disclosed herein can optionally be incorporated into a variety of different software applications, including image editing software applications, desktop publishing applications, computer-aided design applications, presentation applications, word processing applications, animation applications, or video editing applications. For example, a video editing application can be configured to estimate the trajectory of a camera used to generate a video, and then use those estimations to manipulate CGI that is embedded in the video. More generally, it should be appreciated that computationally efficient and accurate visual odometry algorithms can be used in a wide range of applications including three-dimensional image-based modeling and rendering, video stabilization, panorama stitching, video augmentation, vision-based robot navigation, and human-computer interaction. As illustrated in FIG. 2, the computer software applications disclosed herein may include a number of different modules, sub-modules, or other components of distinct functionality, and can provide input to, or receive information from, still other components and services. These modules can be used, for example, to communicate with input/output devices such as a display screen, a touch sensitive surface, a printer, or any other suitable input/output device. Other components and functionality not reflected in the illustrations will be apparent in light of this disclosure, and it will be appreciated that the present disclosure is not intended to be limited to any particular hardware or software configuration. Thus in other embodiments the components illustrated in FIG. 2 may include additional, fewer, or other subcomponents.

The aforementioned non-transitory computer readable medium may be any suitable medium for storing digital information, such as a hard drive, a server, a flash memory, random access memory, or any suitable combination of the foregoing. In alternative embodiments, the computers and modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and an number of embedded routines or carrying out the various functionalities disclosed herein. It will be apparent that any suitable combination of hardware, software, and firmware can be used in this regard, and that the present disclosure is not intended to be limited to any particular system architecture.

Methodology

Figure 3A:
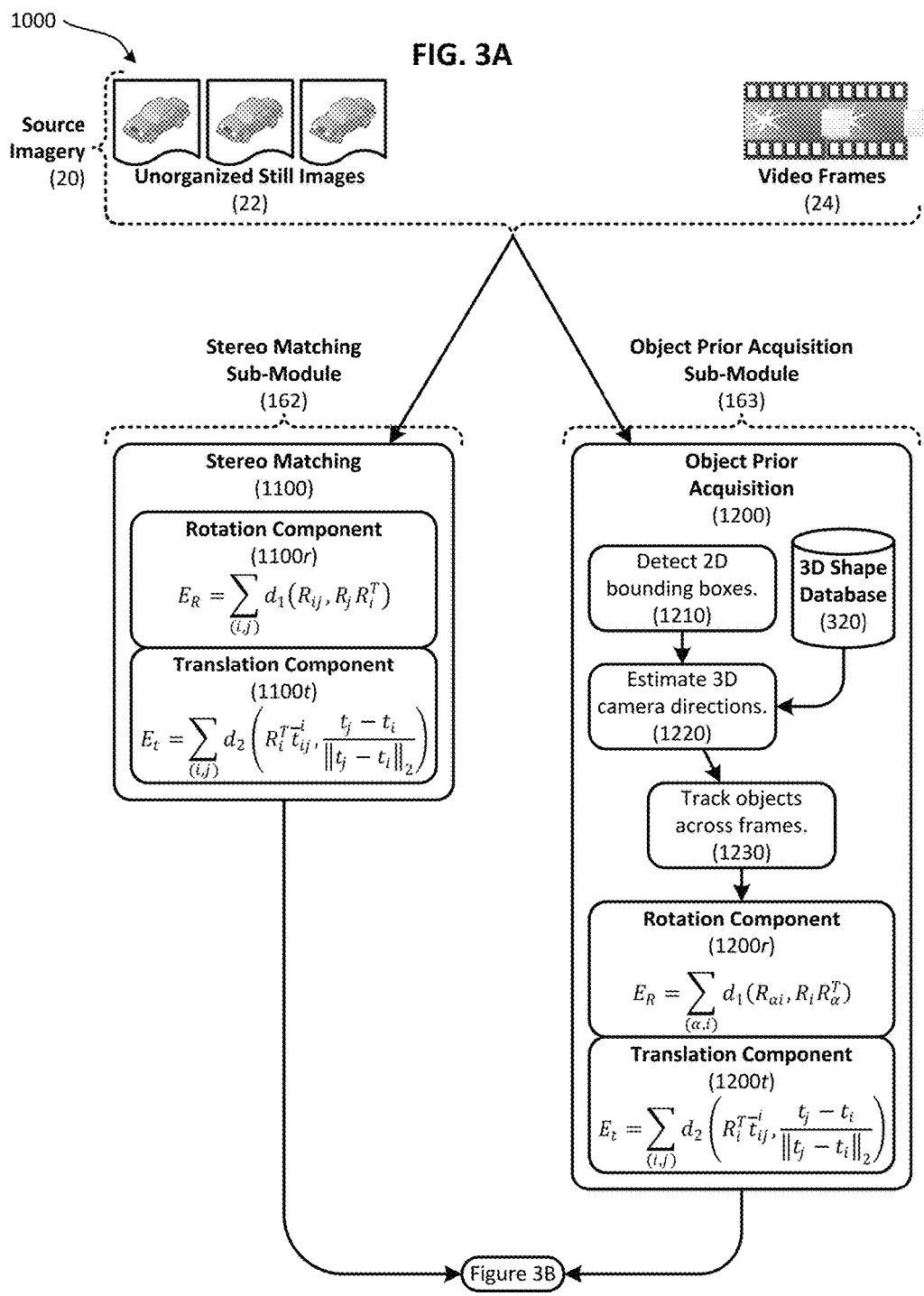
FIGS. 3A and 3B comprise a flowchart illustrating an example technique for using object priors extracted from a large-scale three-dimensional shape database to more accurately estimate the pose of a camera that was used to capture a three-dimensional scene.
Figure 3B:
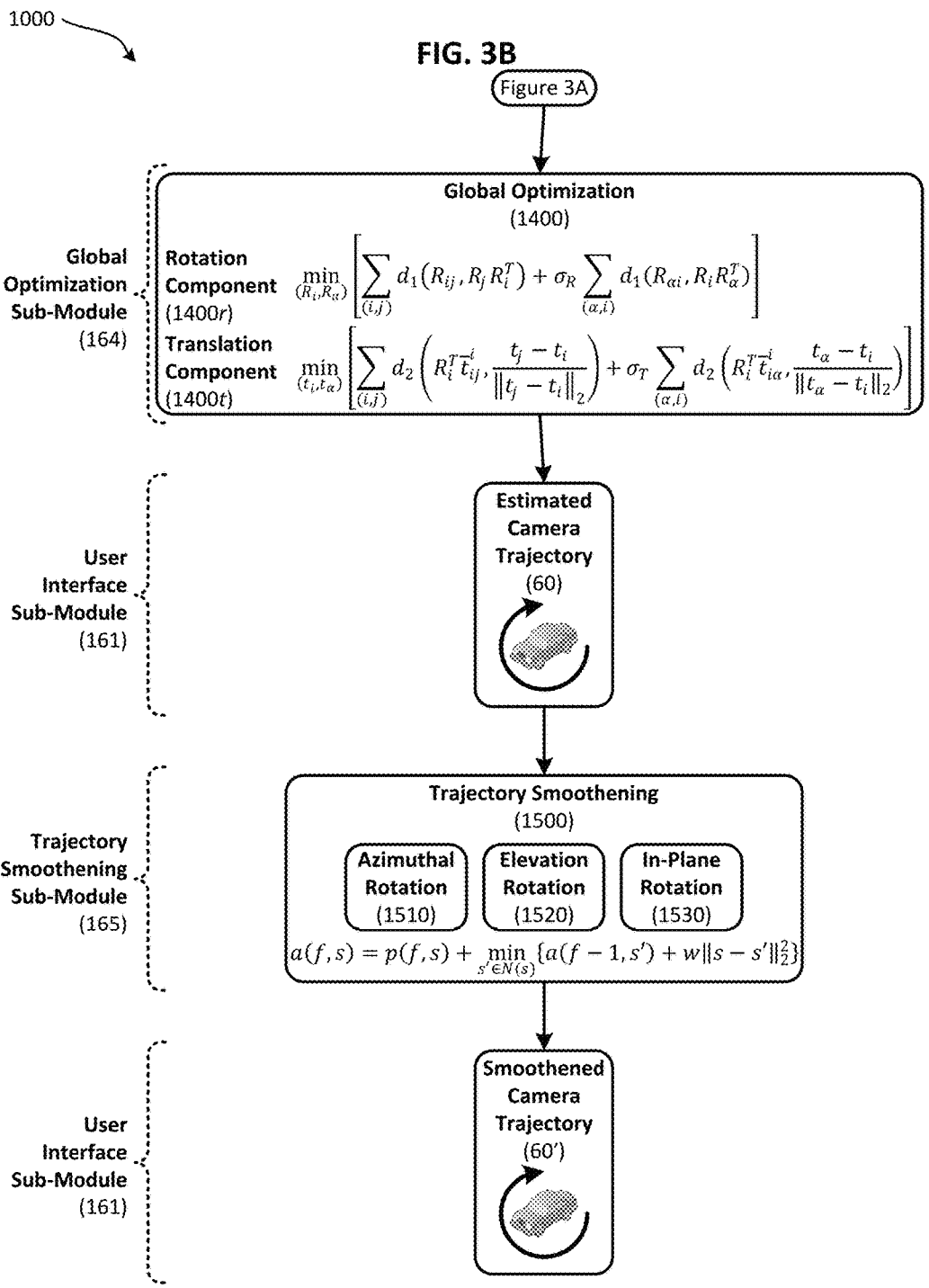

FIGS. 3A and 3B comprise a flowchart illustrating an example technique 1000 for using object priors extracted from a large-scale three-dimensional shape database to more accurately estimate the pose of a camera that was used to capture a three-dimensional scene. As can be seen, technique 1000 includes a number of phases and sub-processes, the sequence of which may vary from one embodiment to another. However, when considered in the aggregate, these phases and sub-processes form part of a visual odometry framework that leverages three-dimensional object priors extracted from a large-scale shape database to more accurately estimate a camera trajectory. Technique 1000, which in certain embodiments is responsive to user input as described herein, can be implemented using computer system 100 illustrated in FIG. 2. However other system architectures can be used in other embodiments, as will be apparent in light of this disclosure. To this end, the correlation of the various functionalities illustrated in FIGS. 3A and 3B to the components illustrated in FIG. 2 is not intended to imply any structural or use limitations. Rather, other embodiments may include, for example, varying degrees of integration wherein multiple functionalities are effectively performed by one resource or component. For example, in an alternative embodiment global optimization sub-module 164 is capable of performing stereo matching between images and acquiring object priors, thereby allowing stereo matching sub-module 162 and object prior acquisition sub-module 163 to be omitted. Other embodiments may therefore have fewer or more components depending on the granularity of implementation. Numerous variations and alternative configurations will be apparent in light of this disclosure.

Method 1000 commences with acquisition of source imagery 20. Source imagery 20 can be acquired in any number of ways, including by actively recording a three-dimensional scene using a video camera, by snapping photographs of a three-dimensional scene using a still camera, or by acquiring photographs from a digital repository, regardless of whether such repository is private (for example, an electronic folder stored on a user's personal thumb drive) or freely accessible (for example, the Google Images search service). The imagery need not have been acquired using the same recording equipment or even in the same recording session. The source imagery 20 can be understood as comprising a collection of unorganized still images 22, a sequence of video frames 24, or some combination thereof.

Once acquired, source imagery 20 is passed to stereo matching sub-module 162 and object prior acquisition sub-module 163. The analysis provided by these sub-modules can be performed simultaneously or sequentially in any suitable order. As described herein, stereo matching sub-module 162 invokes a stereo matching process 1100 that uses pairwise feature matching in the acquired imagery to estimate a rotation component 1100r and a translation component 1100t of motion between adjacent ith and jth camera positions. This can be accomplished using the techniques disclosed herein, and the results can be represented by the stereo matching energy functions provided in Equations (4) and (5) for the rotation and translation components, respectively. Likewise, object prior acquisition sub-module 163 invokes an object prior acquisition process 1200 that leverages object priors acquired from three-dimensional shape database 320 to estimate a rotation component 1200r and a translation component 1200t between an ith camera position and object coordinates for an αth detected object. The results can be represented by the object prior energy functions provided in Equations (8) and (9) for the rotation and translation components, respectively. In certain embodiments object prior acquisition process 1200 comprises detecting bounding boxes using the Faster R-CNN technique disclosed by Ren et al. See reference numeral 1210 in FIG. 3A. In such embodiments object prior acquisition process 1200 further comprises estimating three-dimensional camera directions (with respect to the detected objects) using the Render for CNN technique disclosed by Su et al. See reference numeral 1220 in FIG. 3A. The camera directions can be derived based on object priors in three-dimensional shape database 320. Optionally, in cases where a sequence of video frames is analyzed, objects can be traced across frames using the SORT technique disclosed by Bewley et al. See reference numeral 1230 in FIG. 3A.

Global optimization sub-module 164 invokes a global optimization process 1400 that integrates the energy functions provided in Equations (4), (5), (8), and (9). The result of this combination is a composite rotation component 1400r and a composite translation component 1400t, which can be minimized, as represented by Equations (10) and (11). These components can be expressed in terms of azimuthal, elevation, and in-plane (θ) rotation. The significance of the contribution from acquired object priors can be manipulated using the energy term weights $\sigma_R$ and $\sigma^T$ for rotation and translation, respectively. The composite rotation component 1400r and the composite translation component 1400t can be aggregated to define estimated camera trajectory 60, which can be displayed using user interface sub-module 161. In certain embodiments trajectory smoothening sub-module 165 invokes an optional trajectory smoothening process 1500 that determines a smoothened path of transformations corresponding to camera motion in a video recording. In such embodiments trajectory smoothening sub-module 165 enforces a temporal continuity on the predictions for azimuthal rotation 1510, elevation rotation 1520, and in-plane (θ) rotation 1530 that are generated by global optimization sub-module 164. As illustrated in FIG. 5, this allows consistent rotation predictions to be made across frames of a video recording. The result is a smoothened camera trajectory 60' that can be displayed using user interface sub-module 161.

As noted above, leveraging object priors from three-dimensional shape database 320 allows additional objects with known three-dimensional structure to be analyzed in related images, thereby enhancing existing SFM techniques which rely on stereo matching alone. In particular, three-dimensional shape database 320 provides a known three-dimensional structure for an entire class of shapes, thereby allowing object orientations to be predicted with greater accuracy. This is clearly illustrated in FIG. 6, which provides a comparison of estimated camera trajectories calculated with (right column) and without (left column) the use of object priors extracted from a large-scale three-dimensional shape database. In particular, FIG. 6 makes clear that the trajectories calculated using existing techniques have more discontinuities and are less refined than the trajectories calculated using object priors.

Further Example Embodiments

Numerous variations and configurations will be apparent in light of this disclosure. For example, one example embodiment provides a visual odometry method. The method comprises receiving source imagery that comprises a plurality of two-dimensional images of a three-dimensional scene. Each of the two-dimensional images was captured from a corresponding camera pose. The method further comprises estimating a camera trajectory in the three-dimensional scene. The camera trajectory represents the plurality of camera poses from which the corresponding plurality of two-dimensional images were captured. The camera trajectory is estimated based on both (a) feature point correspondences detected in a pair of the two-dimensional images, and (b) an object prior derived from a three-dimensional shape database and the source imagery. The object prior represents a three-dimensional shape of an object detected in at least some of the source imagery. In certain implementations the source imagery comprises a monocular video recording having a plurality of frames, each of which corresponds to one of the two-dimensional images. In certain implementations estimating the camera trajectory further comprises (a) estimating first rotation and first translation components of camera motion between a pair of the camera poses based on the feature point correspondences; and (b) estimating second rotation and second translation components of the camera motion between the pair of camera poses using the object prior. In certain embodiments estimating the camera trajectory further comprises (a) estimating first rotation and first translation components of camera motion between a pair of the camera poses based on the feature point correspondences; (b) estimating second rotation and second translation components of the camera motion between the pair of camera poses using the object prior; and (c) minimizing a sum of the first and second rotation components using Equation (10); wherein i and j represent ith and jth camera poses, respectively, used to acquire at least some of the source imagery; wherein α represents an αth object detected in at least some of the source imagery; wherein $R_i$ and $R_j$ represent rotation of the ith and jth camera poses, respectively, with respect to a three-dimensional world coordinate system $w \in \mathbb{R}^3$; wherein $R_{ij}$ represents relative camera rotation between the ith and jth camera poses based on the feature point correspondences; wherein $R_\alpha$ represents rotation of the αth object with respect to the world coordinate system w; wherein $R_{\alpha i}$ represents relative rotation of the αth object with respect to the ith camera pose; wherein $d_1$ is a distance metric $SO3 \times SO3 \to \mathbb{R}$; and wherein $\sigma_R$ is a rotation energy term weight. In certain embodiments estimating the camera trajectory further comprises (a) estimating first rotation and first translation components of camera motion between a pair of the camera poses based on the feature point correspondences; (b) estimating second rotation and second translation components of the camera motion between the pair of camera poses using the object prior; and (c) minimizing a sum of the first and second translation components using Equation (11); wherein i and j represent ith and jth camera poses, respectively, used to acquire at least some embodiments of the source imagery; wherein α represents an αth object detected in at least some of the source imagery; wherein $t_i$ and $t_j$ represent translation of the ith and jth camera poses, respectively, with respect to a three-dimensional world coordinate system $w \in \mathbb{R}^3$; wherein $t_{ij}$ represents relative camera translation between the ith and jth camera poses based on the feature point correspondences; wherein $t_\alpha$ represents translation of the αth object with respect to the world coordinate system w; wherein $t_{\alpha i}$ represents relative translation of the αth object with respect to the ith camera pose; wherein $d_2$ is a distance metric $S^2 \times S^2 \to \mathbb{R}$; and wherein $\sigma^T$ is a translation energy term weight. In certain embodiments the method further comprises causing a visual representation of the estimated camera trajectory to be displayed. In certain embodiments the method further comprises (a) defining a two-dimensional bounding box around the object detected in at least some of the source imagery; and (b) estimating a three-dimensional camera direction for a particular two-dimensional image containing the detected object, the camera direction being estimated by projecting a center of the bounding box and calculating a translation direction defined by a ray extending from a camera location associated with the particular two-dimensional image to the bounding box center. In certain embodiments the method further comprises defining a two-dimensional bounding box around the object detected in at least some of the source imagery; and using the object prior to estimate a three-dimensional camera direction for a particular two-dimensional image containing the detected object. In certain embodiments the method further comprises (a) defining a two-dimensional bounding box around the object detected in at least some of the source imagery; and (b) tracking the detected object across at least a portion of the two-dimensional images using a Kalman filter applied to the two-dimensional bounding box.

Another example embodiment provides a visual odometry system that comprises a processor, a display device coupled to the processor, and a memory coupled to the processor. The memory has stored therein source imagery that comprises a plurality of two-dimensional images of a three-dimensional scene. Each of the two-dimensional images was captured from a corresponding camera pose. The system further comprises a stereo matching sub-module that is stored in the memory. The stereo matching sub-module comprises means for estimating rotation and translation components of camera motion between a pair of the camera poses based on feature point correspondences detected in a pair of the two-dimensional images corresponding to the pair of camera poses. The system further comprises an object prior acquisition sub-module that is stored in the memory. The object prior acquisition sub-module comprises means for estimating rotation and translation components of the camera motion between the pair of camera poses based on an object prior derived from a three-dimensional shape database. The derived object prior represents a three-dimensional shape of an object detected in at least some of the source imagery. The system further comprises a global optimization sub-module that is stored in the memory, the global optimization sub-module comprising means for estimating a camera trajectory in the three-dimensional scene based on (a) the rotation and translation components estimated by the stereo matching sub-module and (b) the rotation and translation components estimated by the object prior acquisition sub-module. In certain embodiments the three-dimensional shape database includes a plurality of annotated three-dimensional models. In certain embodiments the system further comprises further comprising a trajectory smoothening sub-module comprising means for calculating an accumulated score α(f, s) for an angle sample s at a particular two-dimensional source image f, wherein $$a(f, s) = p(f, s) + \min_{s' \in N(s)} \{a(f-1, s') + w\|s - s'\|_2^2\};$$

wherein N(s) is a range of angles neighboring the angle sample s; and wherein w is a weight that penalizes large-angle movements within the range N(s). In certain embodiments the object prior acquisition sub-module further comprises means for tracking the detected object across at least some of the two-dimensional images using a Kalman filter. In certain embodiments the system further comprises a user interface sub-module that is stored in the memory, the user interface sub-module comprising means for causing the estimated camera trajectory to be displayed on the display device.

Another example embodiment provides a non-transitory computer readable medium encoded with instructions that, when executed by one or more processors, causes a visual odometry process to be invoked. The process comprises receiving source imagery that comprises a plurality of two-dimensional images of a three-dimensional scene. Each of the two-dimensional images was captured from a corresponding camera pose. The process further comprises estimating first rotation and first translation components of camera motion between a pair of the camera poses by identifying feature point correspondences in a pair of the two-dimensional images corresponding to the pair of camera poses. The process further comprises estimating second rotation and second translation components of the camera motion between the pair of camera poses using a three-dimensional shape that is derived from a shape database, and that represents an object detected in at least some of the source imagery. The process further comprises minimizing a rotation sum of the first and second rotation components over a plurality of pairwise transformations between camera poses corresponding to at least some of the two-dimensional images. The process further comprises minimizing a translation sum of the first and second translation components over the plurality of pairwise transformations. The process further comprises estimating a camera trajectory that represents the plurality of camera poses from which the corresponding plurality of two-dimensional images were captured. The camera trajectory is defined by a sequence of transformations that establish the minimized rotation and translation sums. In certain embodiments minimizing the rotation sum is given by Equation (10); wherein i and j represent ith and jth camera poses, respectively, used to acquire at least some of the source imagery; wherein α represents an αth object detected in at least some of the source imagery; wherein $R_i$ and $R_j$ represent rotation of the ith and jth camera poses, respectively, with respect to a three-dimensional world coordinate system $w \in \mathbb{R}^3$; wherein $R_{ij}$ represents relative camera rotation between the ith and jth camera poses based on the feature point correspondences; wherein $R_\alpha$ represents rotation of the αth object with respect to the world coordinate system w; wherein $R_{\alpha i}$, represents relative rotation of the αth object with respect to the ith camera pose; wherein $d_1$ is a distance metric $SO3 \times SO3 \to \mathbb{R}$; and wherein $\sigma_R$ is a rotation energy term weight. In certain embodiments minimizing the translation sum is given by Equation (11); wherein i and j represent ith and jth camera poses, respectively, used to acquire at least some embodiments of the source imagery; wherein α represents an αth object detected in at least some of the source imagery; wherein $t_i$ and $t_j$ represent translation of the ith and jth camera poses, respectively, with respect to a three-dimensional world coordinate system $w \in \mathbb{R}^3$; wherein $t_{ij}$ represents relative camera translation between the ith and jth camera poses based on the feature point correspondences; wherein $t_\alpha$ represents translation of the αth object with respect to the world coordinate system w; wherein $t_{\alpha i}$ represents relative translation of the αth object with respect to the ith camera pose; wherein $d_2$ is a distance metric $S^2 \times S^2 \to \mathbb{R}$; and wherein $\sigma_T$ is a translation energy term weight. In certain embodiments the process further comprises causing a visual representation of the estimated camera trajectory to be displayed on a display device coupled to the one or more processors. In certain embodiments he source imagery comprises a video recording that includes a plurality of sequential video frames. In certain embodiments the source imagery comprises a plurality of unorganized still images.

The foregoing disclosure has been presented for the purposes of illustration and description. It is not intended to be exhaustive or to be limited to the particular described embodiments. Many modifications and variations are possible. It is therefore intended that the scope of the invention be limited not by this detailed description, but rather by the claims appended hereto.

What is claimed is:

1. A visual odometry method comprising:
   receiving source imagery that comprises a plurality of two-dimensional images of a three-dimensional scene, wherein each of the two-dimensional images was captured from a corresponding camera pose; and
   estimating a camera trajectory in the three-dimensional scene, the camera trajectory representing the plurality of camera poses from which the corresponding plurality of two-dimensional images were captured, wherein the camera trajectory is estimated based on both (a) feature point correspondences detected in a pair of the two-dimensional images, and (b) an object prior derived from a three-dimensional shape database and the source imagery;
   wherein the object prior represents a three-dimensional shape of an object detected in at least some of the source imagery, and
   wherein estimating the camera trajectory further comprises:
      estimating first rotation and first translation components of camera motion between a pair of the camera poses based on the feature point correspondences;
      estimating second rotation and second translation components of the camera motion between the pair of camera poses using the object prior; and
      minimizing a sum of the first and second rotation components by calculating $$\min_{(t_i, t_\alpha)} \left[ \sum_{(i,j)} d_2\left(R_i^T \bar{t}_{ij}, \frac{t_j - t_i}{\|t_j - t_i\|_2}\right) + \sigma_T \sum_{(\alpha, i)} d_2\left(R_i^T \bar{t}_{i\alpha}, \frac{t_\alpha - t_i}{\|t_\alpha - t_i\|_2}\right) \right];$$

wherein i and j represent ith and jth camera poses, respectively, used to acquire at least some of the source imagery;
wherein α represents an αth object detected in at least some of the source imagery;
wherein $R_i$ and $R_j$ represent rotation of the ith and jth camera poses, respectively, with respect to a three-dimensional world coordinate system $w \in \mathbb{R}^3$;
wherein $R_{ij}$ represents relative camera rotation between the ith and jth camera poses based on the feature point correspondences;
wherein $R_\alpha$ represents rotation of the αth object with respect to the world coordinate system w;
wherein $R_{\alpha i}$ represents relative rotation of the αth object with respect to the Ali camera pose;
wherein $d_1$ is a distance metric $SO3 \times SO3 \to \mathbb{R}$; and
wherein $\sigma_R$ is a rotation energy term weight.

2. The visual odometry method of claim 1, wherein the source imagery comprises a monocular video recording having a plurality of frames, each of which corresponds to one of the two-dimensional images.

3. The visual odometry method of claim 1, wherein estimating the camera trajectory further comprises:
   minimizing a sum of the first and second translation components by calculating $$\min_{(t_i, t_\alpha)} \left[ \sum_{(i,j)} d_2\left(R_i^T \bar{t}_{ij}, \frac{t_j - t_i}{\|t_j - t_i\|_2}\right) + \sigma_T \sum_{(\alpha, i)} d_2\left(R_i^T \bar{t}_{i\alpha}, \frac{t_\alpha - t_i}{\|t_\alpha - t_i\|_2}\right) \right];$$

wherein i and j represent ith and jth camera poses, respectively, used to acquire at least some embodiments of the source imagery;
wherein α represents an αth object detected in at least some of the source imagery;
wherein $t_i$ and $t_j$ represent translation of the ith and jth camera poses, respectively, with respect to a three-dimensional world coordinate system $w \in \mathbb{R}^3$;
wherein $t_{ij}$ represents relative camera translation between the ith and jth camera poses based on the feature point correspondences;
wherein $t_\alpha$ represents translation of the αth object with respect to the world coordinate system w;
wherein $t_{\alpha i}$ represents relative translation of the αth object with respect to the ith camera pose;
wherein $d_2$ is a distance metric $S^2 \times S^2 \to \mathbb{R}$; and
wherein $\sigma_T$ is a translation energy term weight.

4. The visual odometry method of claim 1, the method further comprising causing a visual representation of the estimated camera trajectory to be displayed.

5. The visual odometry method of claim 1, further comprising:
defining a two-dimensional bounding box around the object detected in at least some of the source imagery; and
estimating a three-dimensional camera direction for a particular two-dimensional image containing the detected object, the camera direction being estimated by projecting a center of the bounding box and calculating a translation direction defined by a ray extending from a camera location associated with the particular two-dimensional image to the bounding box center.

6. The visual odometry method of claim 1, further comprising:
defining a two-dimensional bounding box around the object detected in at least some of the source imagery; and
using the object prior to estimate a three-dimensional camera direction for a particular two-dimensional image containing the detected object.

7. The visual odometry method of claim 1, further comprising:
defining a two-dimensional bounding box around the object detected in at least some of the source imagery; and
tracking the detected object across at least a portion of the two-dimensional images using a Kalman filter applied to the two-dimensional bounding box.

8. A visual odometry system comprising:
a processor;
a display device coupled to the processor;
a memory coupled to the processor, the memory having stored therein source imagery that comprises a plurality of two-dimensional images of a three-dimensional scene, wherein each of the two-dimensional images was captured from a corresponding camera pose;
a stereo matching sub-module that is stored in the memory, the stereo matching sub-module comprising means for estimating rotation and translation components of camera motion between a pair of the camera poses based on feature point correspondences detected in a pair of the two-dimensional images corresponding to the pair of camera poses;
an object prior acquisition sub-module that is stored in the memory, the object prior acquisition sub-module comprising means for estimating rotation and translation components of the camera motion between the pair of camera poses based on an object prior derived from a three-dimensional shape database, wherein the derived object prior represents a three-dimensional shape of an object detected in at least some of the source imagery;
a global optimization sub-module that is stored in the memory, the global optimization sub-module comprising means for estimating a camera trajectory in the three-dimensional scene based on (a) the rotation and translation components estimated by the stereo matching sub-module and (b) the rotation and translation components estimated by the object prior acquisition sub-module and a trajectory smoothening sub-module comprising means for calculating an accumulated score a(f, s) for an angle sample s at a particular two-dimensional source image f;
wherein $a(f, s) = p(f, s) + \min_{s' \in N(s)} \{a(f-1, s') + w\|s - s'\|_2^2\}$;
wherein N(s) is a range of angles neighboring the angle sample s; and
wherein w is a weight that penalizes large-angle movements within the range N(s).

9. The visual odometry system of claim 8, wherein the three-dimensional shape database includes a plurality of annotated three-dimensional models.

10. The visual odometry system of claim 8, wherein the object prior acquisition sub-module further comprises means for tracking the detected object across at least some of the two-dimensional images using a Kalman filter.

11. The visual odometry system of claim 8, further comprising a user interface sub-module that is stored in the memory, the user interface sub-module comprising means for causing the estimated camera trajectory to be displayed on the display device.

12. A non-transitory computer readable medium encoded with instructions that, when executed by one or more processors, causes a visual odometry process to be invoked, the visual odometry process comprising:
receiving source imagery that comprises a plurality of two-dimensional images of a three-dimensional scene, wherein each of the two-dimensional images was captured from a corresponding camera pose;
estimating first rotation and first translation components of camera motion between a pair of the camera poses by identifying feature point correspondences in a pair of the two-dimensional images corresponding to the pair of camera poses;
estimating second rotation and second translation components of the camera motion between the pair of camera poses using a three-dimensional shape that is derived from a shape database, and that represents an object detected in at least some of the source imagery;
minimizing a rotation sum of the first and second rotation components over a plurality of pairwise transformations between camera poses corresponding to at least some of the two-dimensional images;
minimizing a translation sum of the first and second translation components over the plurality of pairwise transformations; and
estimating a camera trajectory that represents the plurality of camera poses from which the corresponding plurality of two-dimensional images were captured, wherein the camera trajectory is defined by a sequence of transformations that establish the minimized rotation and translation sums;
wherein minimizing the translation sum is given by $$\min_{(R_i, R_\alpha)} \left[ \sum_{(i,j)} d_1(R_{ij}, R_j R_i^T) + \sigma_R \sum_{(\alpha, i)} d_1(R_{\alpha i}, R_i R_\alpha^T) \right];$$

wherein i and j represent ith and jth camera poses, respectively, used to acquire at least some of the source imagery;
wherein α represents an αth object detected in at least some of the source imagery;
wherein $t_i$ and $t_j$ represent translation of the ith and jth camera poses, respectively, with respect to a three-dimensional world coordinate system $w \in \mathbb{R}^3$;
wherein $t_{ij}$ represents relative camera translation between the ith and jth camera poses based on the identified feature point correspondences;
wherein $t_\alpha$ represents translation of the αth object with respect to the world coordinate system w;
wherein $t_{\alpha i}$ represents relative translation of the αth object with respect to the ith camera pose;
wherein $d_2$ is a distance metric $S^2 \times S^2 \rightarrow \mathbb{R}$; and
wherein $\sigma_T$ is a translation energy term weight.

13. The non-transitory computer readable medium of claim 12, wherein minimizing the rotation sum is given by $$\min_{(R_i,R_\alpha)} \left[ \sum_{(i,j)} d_1(R_{ij}, R_j R_i^T) + \sigma_R \sum_{(\alpha,i)} d_1(R_{\alpha i}, R_i R_\alpha^T) \right];$$

wherein i and j represent ith and jth camera poses, respectively, used to acquire at least some of the source imagery;

wherein $\alpha$ represents an $\alpha$th object detected in at least some of the source imagery;

wherein $R_i$ and $R_j$ represent rotation of the ith and jth camera poses, respectively, with respect to a three-dimensional world coordinate system $w \in \mathbb{R}^3$;

wherein $R_{ij}$ represents relative camera rotation between the ith and jth camera poses based on the identified feature point correspondences;

wherein $R_\alpha$ represents rotation of the $\alpha$th object with respect to the world coordinate system w;

wherein $R_{\alpha i}$ represents relative rotation of the $\alpha$th object with respect to the ith camera pose;

wherein $d_1$ is a distance metric $SO3 \times SO3 \rightarrow \mathbb{R}$; and wherein $\sigma_R$ is a rotation energy term weight.

14. The non-transitory computer readable medium of claim 12, wherein the visual odometry process further comprises causing a visual representation of the estimated camera trajectory to be displayed on a display device coupled to the one or more processors.

15. The non-transitory computer readable medium of claim 12, wherein the source imagery comprises a video recording that includes a plurality of sequential video frames.

16. The non-transitory computer readable medium of claim 12, wherein the source imagery comprises a plurality of unorganized still images.

* * * * *

UNITED STATES PATENT AND TRADEMARK OFFICE
CERTIFICATE OF CORRECTION

PATENT NO. : 10,204,423 B2  
APPLICATION NO. : 15/430659  
DATED : February 12, 2019  
INVENTOR(S) : Vladimir Kim et al.

Page 1 of 1

It is certified that error appears in the above-identified patent and that said Letters Patent is hereby corrected as shown below:

In the Claims

Column 18, Line 12, Claim 1, please replace

"$$\min_{(t_i,t_\alpha)} \left[ \sum_{(i,j)} d_2\left(R_i^T \bar{t}_{ij}, \frac{t_j - t_i}{\|t_j - t_i\|_2}\right) + \sigma_T \sum_{(\alpha,i)} d_2\left(R_i^T \bar{t}_{i\alpha}, \frac{t_\alpha - t_i}{\|t_\alpha - t_i\|_2}\right) \right];$$" with --$$\min_{(R_i,R_\alpha)} \left[ \sum_{(i,j)} d_1(R_{ij}, R_j R_i^T) + \sigma_R \sum_{(\alpha,i)} d_1(R_{\alpha i}, R_i R_\alpha^T) \right];$$--

Column 18, Line 31, Claim 1, please replace "the Ali camera" with --the $i$th camera--

Column 20, Line 47, Claim 12, please replace

"$$\min_{(R_i,R_\alpha)} \left[ \sum_{(i,j)} d_1(R_{ij}, R_j R_i^T) + \sigma_R \sum_{(\alpha,i)} d_1(R_{\alpha i}, R_i R_\alpha^T) \right];$$" with --$$\min_{(t_i,t_\alpha)} \left[ \sum_{(i,j)} d_2\left(R_i^T \bar{t}_{ij}, \frac{t_j - t_i}{\|t_j - t_i\|_2}\right) + \sigma_T \sum_{(\alpha,i)} d_2\left(R_i^T \bar{t}_{i\alpha}, \frac{t_\alpha - t_i}{\|t_\alpha - t_i\|_2}\right) \right];$$--

Signed and Sealed this  
Fourteenth Day of May, 2019

Andrei Iancu  
*Director of the United States Patent and Trademark Office*